(12) United States Patent
Sakashita et al.

(10) Patent No.: US 10,884,738 B2
(45) Date of Patent: Jan. 5, 2021

(54) ARITHMETIC PROCESSING DEVICE AND METHOD OF CONTROLLING ARITHMETIC PROCESSING DEVICE

(71) Applicant: FUJITSU LIMITED, Kawasaki (JP)

(72) Inventors: Sota Sakashita, Kawasaki (JP); Toshio Yoshida, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 15/976,172

(22) Filed: May 10, 2018

(65) Prior Publication Data

US 2018/0349139 A1 Dec. 6, 2018

(30) Foreign Application Priority Data

May 31, 2017 (JP) ................................. 2017-108432

(51) Int. Cl.
*G06F 9/30* (2018.01)
*G06F 9/38* (2018.01)

(52) U.S. Cl.
CPC ........ *G06F 9/30043* (2013.01); *G06F 9/3824* (2013.01); *G06F 9/3834* (2013.01); *G06F 9/3836* (2013.01); *G06F 9/3855* (2013.01)

(58) Field of Classification Search
None
See application file for complete search history.

(56) References Cited

U.S. PATENT DOCUMENTS

2017/0090934 A1* 3/2017 Di ..................... G06F 9/3814

FOREIGN PATENT DOCUMENTS

JP          2009-193378        8/2009

* cited by examiner

*Primary Examiner* — John M Lindlof
(74) *Attorney, Agent, or Firm* — Staas & Halsey LLP

(57) ABSTRACT

A Load and Store Queue (LDSTQ) stores load store instructions therein with an upper limit being a first number, and sequentially outputs the stored load store instructions to cause a data cache or a main memory to execute processing of data in accordance with the output load store instructions. A decode unit acquires load store instructions, and determines a queued number of load store instructions which have not been output from the LDSTQ among load store instructions output from the decode unit. When the queued number is smaller than a second number which is larger than the first number, the decode unit outputs the acquired load store instructions. An LDSTQ management unit acquires the output load store instructions. When the stored number of load store instructions stored in the LDSTQ is smaller than the first number, the LDSTQ management unit stores the acquired load store instructions in the LDSTQ.

5 Claims, 10 Drawing Sheets

FIG.6

| 600 | | 601 | | 602 | | 603 | | 604 | |
|---|---|---|---|---|---|---|---|---|---|
| PROVISIONAL LDSTQ NUMBER | | PROVISIONAL LDSTQ NUMBER | | PROVISIONAL LDSTQ NUMBER | | PROVISIONAL LDSTQ NUMBER | | PROVISIONAL LDSTQ NUMBER | |
| GROUP NUMBER | LDSTQ NUMBER | GROUP NUMBER | LDSTQ NUMBER | GROUP NUMBER | LDSTQ NUMBER | GROUP NUMBER | LDSTQ NUMBER | GROUP NUMBER | LDSTQ NUMBER |
| 3 | 9 | 3 | 9 | 3 | 9 | 3 | 9 | 3 | 9 |
| 3 | 8 | 3 | 8 | 3 | 8 | 3 | 8 | 3 | 8 |
| 3 | 7 | 3 | 7 | 3 | 7 | 3 | 7 | 3 | 7 |
| 3 | 6 | 3 | 6 | 3 | 6 | 3 | 6 | 3 | 6 |
| 3 | 5 | 3 | 5 | 3 | 5 | 3 | 5 | 3 | 5 |
| 3 | 4 | 3 | 4 | 3 | 4 | 3 | 4 | 3 | 4 |
| 3 | 3 | 3 | 3 | 3 | 3 | 3 | 3 | 3 | 3 |
| 3 | 2 | 3 | 2 | 3 | 2 | 3 | 2 | 3 | 2 |
| 3 | 1 | 3 | 1 | 3 | 1 | 3 | 1 | 3 | 1 |
| 3 | 0 | 3 | 0 | 3 | 0 | 3 | 0 | 3 | 0 |
| 2 | 9 | 2 | 9 | 2 | 9 | 2 | 9 | 2 | 9 |
| 2 | 8 | 2 | 8 | 2 | 8 | 2 | 8 | 2 | 8 |
| 2 | 7 | 2 | 7 | 2 | 7 | 2 | 7 | 2 | 7 |
| 2 | 6 | 2 | 6 | 2 | 6 | 2 | 6 | 2 | 6 |
| 2 | 5 | 2 | 5 | 2 | 5 | 2 | 5 | 2 | 5 |
| 2 | 4 | 2 | 4 | 2 | 4 | 2 | 4 | 2 | 4 |
| 2 | 3 | 2 | 3 | 2 | 3 | 2 | 3 | 2 | 3 |
| 2 | 2 | 2 | 2 | 2 | 2 | 2 | 2 | 2 | 2 |
| 2 | 1 | 2 | 1 | 2 | 1 | 2 | 1 | 2 | 1 |
| 2 | 0 | 2 | 0 | 2 | 0 | 2 | 0 | 2 | 0 |
| 1 | 9 | 1 | 9 | 1 | 9 | 1 | 9 | 1 | 9 |
| 1 | 8 | 1 | 8 | 1 | 8 | 1 | 8 | 1 | 8 |
| 1 | 7 | 1 | 7 | 1 | 7 | 1 | 7 | 1 | 7 |
| 1 | 6 | 1 | 6 | 1 | 6 | 1 | 6 | 1 | 6 |
| 1 | 5 | 1 | 5 | 1 | 5 | 1 | 5 | 1 | 5 |
| 1 | 4 | 1 | 4 | 1 | 4 | 1 | 4 | 1 | 4 |
| 1 | 3 | 1 | 3 | 1 | 3 | 1 | 3 | 1 | 3 |
| 1 | 2 | 1 | 2 | 1 | 2 | 1 | 2 | 1 | 2 |
| 1 | 1 | 1 | 1 | 1 | 1 | 1 | 1 | 1 | 1 |
| 1 | 0 | 1 | 0 | 1 | 0 | 1 | 0 | 1 | 0 |
| 0 | 9 | 0 | 9 | 0 | 9 | 0 | 9 | 0 | 9 |
| 0 | 8 | 0 | 8 | 0 | 8 | 0 | 8 | 0 | 8 |
| 0 | 7 | 0 | 7 | 0 | 7 | 0 | 7 | 0 | 7 |
| 0 | 6 | 0 | 6 | 0 | 6 | 0 | 6 | 0 | 6 |
| 0 | 5 | 0 | 5 | 0 | 5 | 0 | 5 | 0 | 5 |
| 0 | 4 | 0 | 4 | 0 | 4 | 0 | 4 | 0 | 4 |
| 0 | 3 | 0 | 3 | 0 | 3 | 0 | 3 | 0 | 3 |
| 0 | 2 | 0 | 2 | 0 | 2 | 0 | 2 | 0 | 2 |
| 0 | 1 | 0 | 1 | 0 | 1 | 0 | 1 | 0 | 1 |
| 0 | 0 | 0 | 0 | 0 | 0 | 0 | 0 | 0 | 0 |

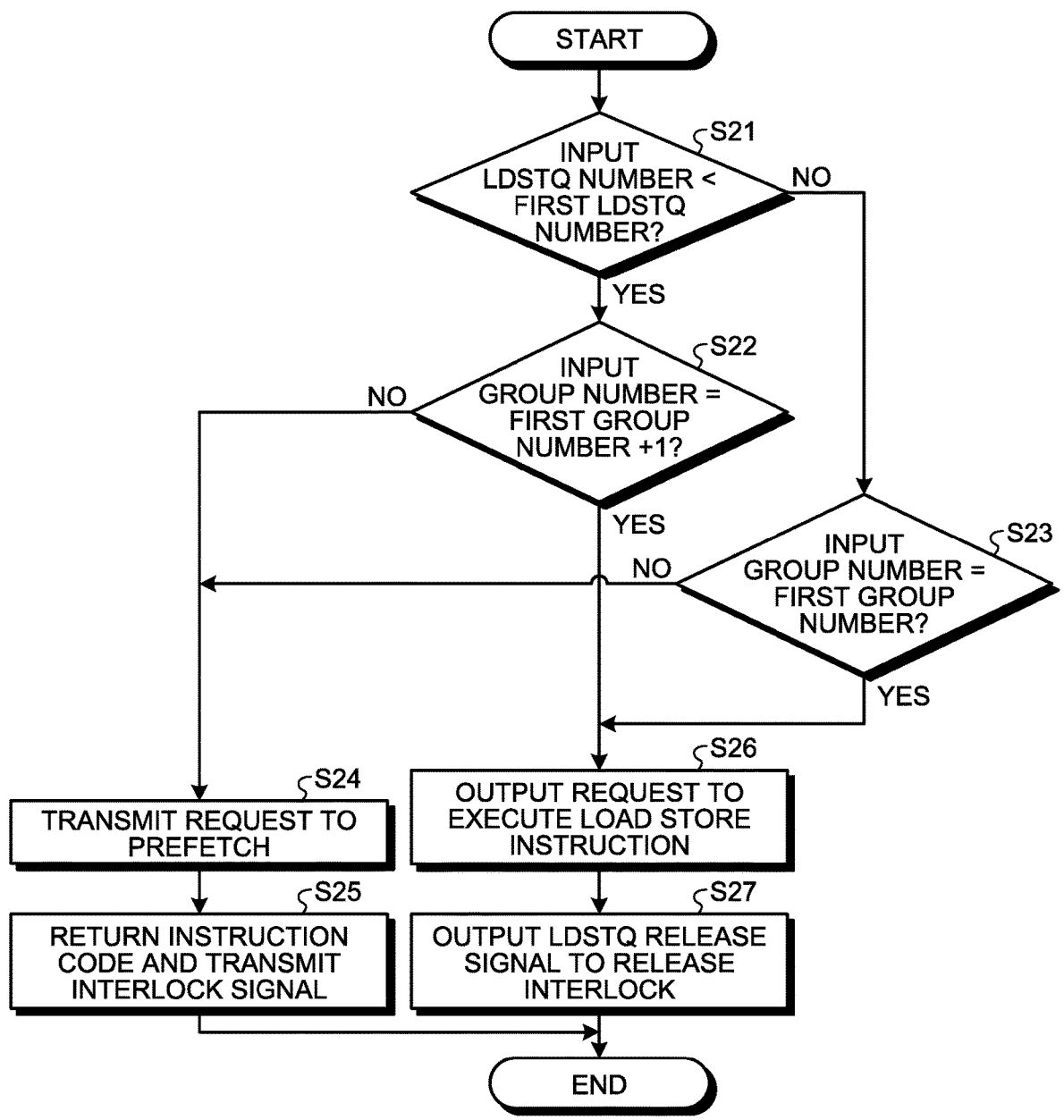

ARITHMETIC PROCESSING DEVICE AND METHOD OF CONTROLLING ARITHMETIC PROCESSING DEVICE

CROSS-REFERENCE TO RELATED APPLICATION

This application is based upon and claims the benefit of priority of the prior Japanese Patent Application No. 2017-108432, filed on May 31, 2017, the entire contents of which are incorporated herein by reference.

FIELD

The embodiments discussed herein are related to an arithmetic processing device and a method of controlling an arithmetic processing device.

BACKGROUND

A processor in an information processing device includes one or more processor cores. Each processor core has an instruction cache, an instruction buffer, a decode unit, a reservation station, an arithmetic execution unit, and a load store unit. The processor core performs the following processing to execute instructions.

Instructions are stored in the instruction cache. Instructions read from the instruction cache by instruction fetch are stored in the instruction buffer. After that, the instruction buffers stored in the instruction buffer are sequentially transmitted to the decode unit. The decode unit performs instruction decoding and inputs the instructions to the reservation station.

The reservation station includes a Reservation Station for Execution (RSE) configured to accumulate arithmetic instructions therein and a Reservation Station for Address (RSA) configured to accumulate load store instructions therein. Determination of whether to input an instruction from the reservation station to each arithmetic execution unit is performed by the reservation station. The reservation station inputs instructions in out-of-order where processable instructions are sequentially processed independent of the arrangement order of instructions. The RSE transmits a fixed-point register number for holding data used for fixed-point arithmetic to the arithmetic execution unit. The RSA also transmits a fixed-point register number used for load store of data to the arithmetic execution unit.

The arithmetic execution unit has a fixed-point arithmetic unit, a fixed-point register as general purpose register (GPR), and an address generation unit. Arithmetic instructions selected by the RSE are input to the fixed-point arithmetic unit. The GPR receives an input of a fixed-point register number. The fixed-point arithmetic unit acquires data on a GPR referenced on the basis of the fixed-point register number, and uses the acquired data to execute input arithmetic instructions. After the end of the arithmetic operation, the fixed-point arithmetic unit writes the arithmetic result in the GPR.

The address generation unit executes load store instructions selected by the RSA. The address generation unit acquires data on a GPR referenced on the basis of the fixed-point register number. The address generation unit outputs an address on a memory to be accessed by the load store instruction. The RSA outputs a load instruction or a store instruction to a load store unit in synchronization with the timing at which the address is generated by the address generation unit.

A data management unit in the load store unit acquires, from the address generation unit, an input of the address on the memory to be accessed. The data management unit receives an input of load instructions or store instructions from the RSA. The data management unit stores load instructions and store instructions in a Load and Store Queue (LDSTQ) to execute load or store.

At timing at which the RSA outputs a load instruction or a store instruction to the load store unit, the RSA releases a region where the output instruction was stored, and transmits the notification thereof to a decoder unit. When the executed load instruction is completed, the data management unit stores the result of reading from the memory in the GPR. The data management unit releases the LDSTQ, and transmits the notification thereof to the decoder unit. When the load instruction is not completed due to cache misses or the like, the instruction is aborted and reissued from the LDSTQ to the data management unit.

A series of processing paths until instructions stored in the instruction buffer are processed, in which processing stages for the storage of instructions in the RSA and the generation of addresses are arranged, is sometimes called "pipeline stage".

One known conventional technology is to set flags to a conflict relation when resources are conflict between an instruction and a preceding instruction and determine, based on the flags, whether to issue the instruction by overtaking the preceding instruction.

Patent Literature 1: Japanese Laid-open Patent Publication No. 2009-193378

However, the processing for the LDSTQ is located on the subsequent stage of the pipeline stage. Thus, a large number of cycles are used until the LDSTQ is released since the start of processing. The decode unit allocates resources in the RSE and the RSA to arithmetic instructions and load store instructions. The decode unit issues a load instruction only when both the LDSTQ and the RSA have free spaces. For example, even when the RSA has a sufficient free space, the decode unit does not issue a load instruction if the LDSTQ has no free space.

In regard to arithmetic instructions that do not use the LDSTQ, on the other hand, the decode unit issues the instruction as long as the RSA or the RSE has a free space. However, it is difficult for the decode unit to issue the instructions by out-of-order execution, and hence when a preceding load store instruction waits for the release in the LDSTQ in the decode unit, the decode unit also sets arithmetic instructions that do not use the LDSTQ to the standby state. Thus, the decode unit does not pack the RSA and the RSE with instructions, which hinders the improvement of use efficiency of the address generation unit and the fixed-point arithmetic unit otherwise achieved by the out-of-order input of instructions by the reservation station.

Load store instructions are allocated to the LDSTQ by the decode unit. An instruction is input to the LDSTQ at timing at which the instruction is issued from the RSA and the instruction is output to the load store unit after the completion of address generation. Specifically, a certain length of period exits from when the LDSTQ is released to when an instruction is actually input to the corresponding free space. This period hinders the improvement of the instruction packing factor in the LDSTQ. A low instruction packing factor in the LDSTQ hinders the improvement of use efficiency of the address generation unit and the fixed-point arithmetic unit otherwise achieved by the out-of-order input of instructions by the reservation station. A conceivable simple method for preventing the performance reduction is to increase the number of instructions that can be stored in the LDSTQ, but this is difficult to implement because the circuit scale may be increased.

Even with the conventional technology for setting flags to the conflict relation, if instructions are issued depending on the state of the LDSTQ, it is difficult to reduce the decrease in use efficiency of an arithmetic unit caused by the occurrence of standby of load store instructions. Furthermore, even with the conventional technology for setting flags to the conflict relation, the period from the release of the LDSTQ to the filling thereof does not change. Also in this point, it is difficult to reduce the decrease in use efficiency of the address generation unit and the fixed-point arithmetic unit.

SUMMARY

According to an aspect of an embodiment, an arithmetic processing device includes: a storage unit that stores therein load store instructions with an upper limit being a first number, and sequentially outputs the stored load store instructions to cause a cache or a memory to execute processing of data in accordance with the output load store instructions; an instruction management unit that acquires load store instructions, determines a queued number of load store instructions which have not been output from the storage unit among load store instructions output from the instruction management unit, and when the queued number is smaller than a second number which is larger than the first number, outputs the acquired load store instructions; and a storage management unit that acquires the load store instructions output from the instruction management unit, and when a stored number of load store instructions stored in the storage unit is smaller than the first number, stores the acquired load store instructions in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a conceptual diagram illustrating data stored in an LDSTQ;

FIG. 10 is a flowchart of request issue processing in an LDSTQ management unit according to the second embodiment.

DESCRIPTION OF EMBODIMENTS

Preferred embodiments of the present invention will be explained with reference to accompanying drawings. The arithmetic processing device and the method of controlling an arithmetic processing device disclosed herein are not limited by the following embodiments.

[a] First Embodiment

Figure 1:
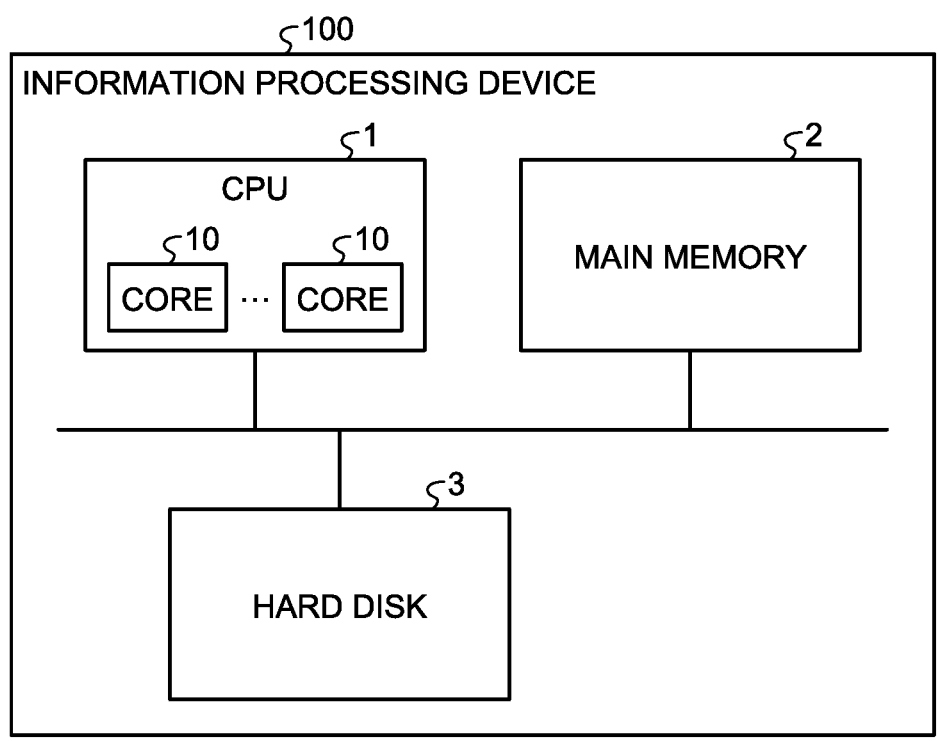
FIG. 1 is a diagram illustrating an exemplary configuration of an information processing device.

FIG. 1 is a diagram illustrating an exemplary configuration of an information processing device. For example, an information processing device 100 includes a central processing unit (CPU) 1, a main memory 2, and a hard disk 3. The CPU 1, the main memory 2, and the hard disk 3 are connected by a bus, and communicate with one another. The CPU 1 has one or more cores 10. The core 10 corresponds to an example of "arithmetic processing device".

In the main memory 2, an instruction queue included in a process generated when a computer program is deployed is stored. The instruction queue includes an arithmetic instruction for executing addition, subtraction, and other such operations and a load store instruction for reading and writing data.

Figure 2:
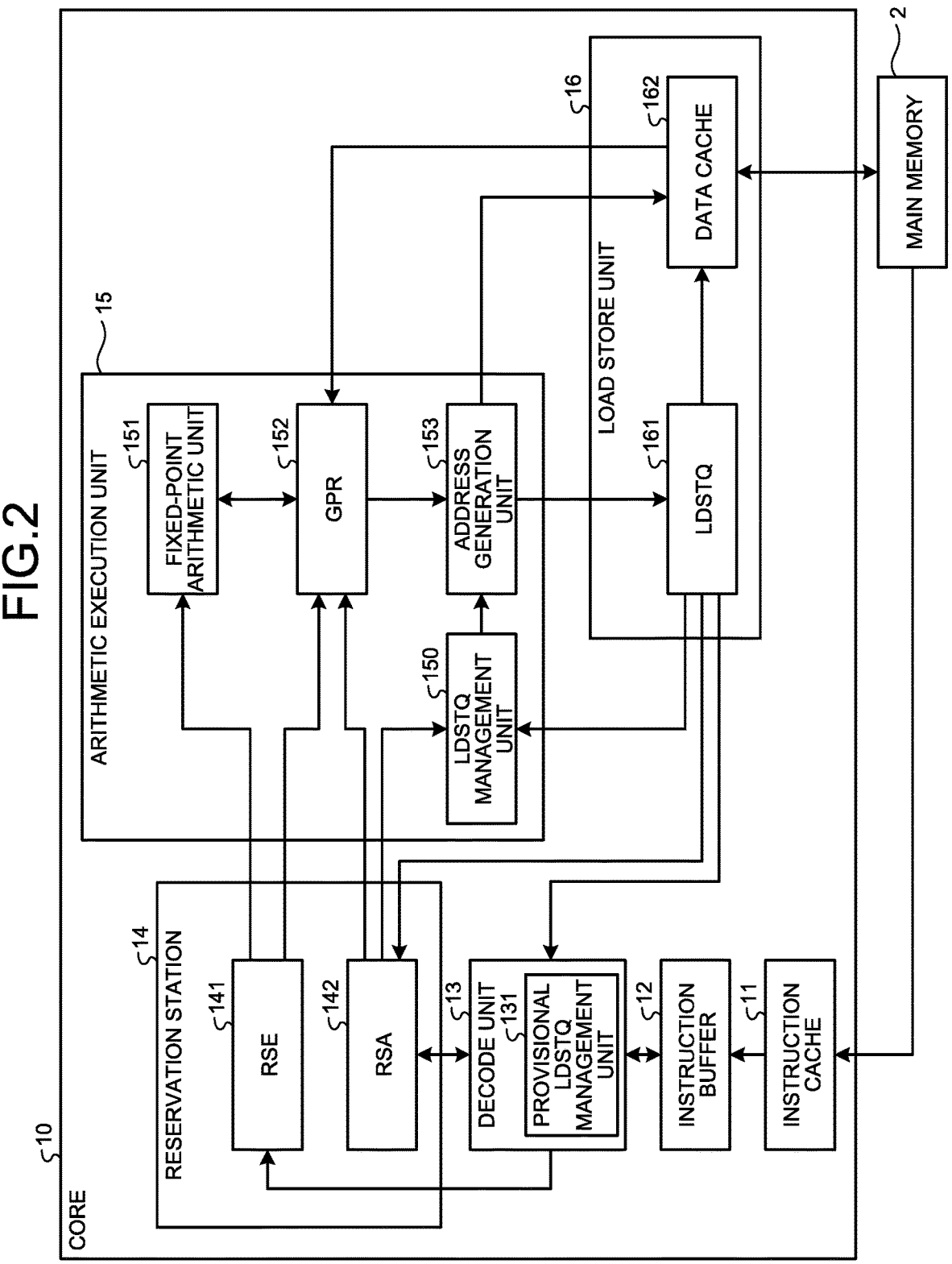
FIG. 2 is a block diagram of a core.

FIG. 2 is a block diagram of the core. The core 10 includes an instruction cache 11, an instruction buffer 12, a decode unit 13, a reservation station 14, an arithmetic execution unit 15, and a load store unit 16.

In the instruction cache 11 illustrated in FIG. 2, instructions included in an instruction queue stored in the main memory 2 when a process deployed on the main memory 2 operates are stored. Instructions stored in the instruction cache 11 are read by the decode unit 13 and stored in the instruction buffer 12. Instructions stored in the instruction buffer 12 are sequentially output to the decode unit 13.

The decode unit 13 reads instructions stored in the instruction cache 11, and stores the read instructions in the instruction buffer 12. The decode unit 13 receives an input of instructions stored in the instruction buffer 12. The decode unit 13 interprets the acquired instructions, and determines whether the instructions are arithmetic instructions or load store instructions.

The decode unit 13 includes a provisional LDSTQ management unit 131. When the provisional LDSTQ management unit 131 described later determines that a load store instruction can be output, the decode unit 13 allocates a provisional LDSTQ number to the load store instruction, thereby provisionally allocates an entry in an LDSTQ 161. The provisional LDSTQ number is a number used for provisionally allocating an entry in the LDSTQ 161 to the load store instruction. In the first embodiment, the provisional LDSTQ number is represented by a combination of a group number and an LDSTQ number indicating an actual entry in the LDSTQ 161. By setting the provisional LDSTQ number in this manner, the LDSTQ number can be easily generated from the provisional LDSTQ number, and the provisional allocation of the entry in the LDSTQ 161 to the load store instruction can be easily changed to the actual allocation. The provisional LDSTQ number may be another number as long as the number can determine the processing order of load store instructions and a mechanism is provided for converting the provisional LDSTQ number into the LDSTQ number.

After that, the decode unit 13 outputs the load store instructions allocated with the provisional LDSTQ number to an RSA 142 in the reservation station 14. When the acquired instructions are arithmetic instructions, the decode unit 13 sequentially outputs the acquired arithmetic instructions to an RSE 141 in the reservation station 14.

The decode unit 13 outputs instruction issues in accordance with the order in which the instructions are issued (in-order). Thus, for example, when the output of a certain instruction is in the standby state, the decode unit 13 causes the output of instructions subsequent to the instruction whose output is set to stand by to stand by. The decode unit 13 corresponds to an example of "instruction management unit" and "instruction management circuit".

The provisional LDSTQ management unit 131 counts the number of load store instructions output from the decode unit 13. The provisional LDSTQ management unit 131 further acquires an LDSTQ release signal from an LDSTQ 161 described later. The LDSTQ release signal is a signal that is output from the LDSTQ 161 when a load store instruction is output to a data cache 162 from an entry, which is a region in the LDSTQ 161 where the load store instruction is stored, and the entry is released. The LDSTQ 161 has an upper limit number of load store instructions that can be stored. In the following, the upper limit number of load store instructions that can be stored in the LDSTQ 161 is referred to as "number of entries" in the LDSTQ 161. Specifically, the LDSTQ release signal is a signal indicating that an entry in the LDSTQ 161 has been released. The number of entries in the LDSTQ 161 corresponds to an example of "first number".

The provisional LDSTQ management unit 131 has in advance an instruction issue upper limit number that is larger than the number of entries in the LDSTQ 161. For example, the provisional LDSTQ management unit 131 stores therein a number that is four times as many as the number of entries in the LDSTQ 161 as the instruction issue upper limit number. Any value larger than the number of entries in the LDSTQ 161 can be used for the instruction issue upper limit number. A larger instruction issue upper limit number can improve out-of-order performance of the RSE 141 and the RSA 142. The above-mentioned number of provisional LDSTQ numbers that can be issued by the decode unit 13 has an upper limit corresponding to the instruction issue upper limit number. The instruction issue upper limit number corresponds to an example of "second number".

The provisional LDSTQ management unit 131 determines the queued number of load store instructions, which is the number of load store instructions that have not yet been output from the LDSTQ 161 among the load store instructions output from the decode unit 13. The provisional LDSTQ management unit 131 determines whether the queued number of load store instructions is smaller than the instruction issue upper limit.

When the queued number of load store instructions is equal to or larger than the instruction issue upper limit, the provisional LDSTQ management unit 131 causes the output of load store instructions from the decode unit 13 to stand by. On the other hand, when the queued number of load store instructions is smaller than the instruction issue upper limit, the provisional LDSTQ management unit 131 determines whether a release signal for the RSA 142, which indicates that a load store instruction has been output, has been acquired from the RSA 142.

When a release signal for the RSA 142 is received, the provisional LDSTQ management unit 131 determines that the RSA 142 has a space for storing a load store instruction therein. When the RSA 142 has a space for storing a load store instruction therein, the provisional LDSTQ management unit 131 notifies the decode unit 13 that the load store instruction can be output, and causes the decode unit 13 to output the load store instruction to the RSA 142 in the reservation station 14.

The reservation station 14 includes an RSE 141 that accumulates arithmetic instructions therein and an RSA 142 that accumulates load store instructions therein.

The RSE 141 receives an input of arithmetic instructions from the decode unit 13. The RSE 141 accumulates the acquired arithmetic instructions therein. The RSE 141 selects arithmetic instructions to be output from among the accumulated arithmetic instructions. After that, the RSE 141 outputs an instruction code indicating addition or subtraction designated by the selected arithmetic instruction to a fixed-point arithmetic unit 151. The RSE 141 further outputs a fixed-point register (GPR: General Purpose Register) number designated by the selected arithmetic instruction to a GPR 152.

The RSA 142 receives an input of load store instructions together with provisional LDSTQ numbers from the decode unit 13. The RSA 142 accumulates therein the acquired load store instructions together with the provisional LDSTQ numbers. The RSA 142 selects load store instructions to be output from amount the accumulated load store instructions. After that, the RSA 142 outputs an instruction code indicating data reading or writing in the selected load store instruction to a LDSTQ management unit 150 together with the provisional LDSTQ number. The RSA 142 outputs a fixed-point register number designated by the selected load store instruction to the GPR 152. The RSA 142 further outputs a release signal for the RSA 142, which indicates that the load store instruction has been output, to the decode unit 13.

The RSA 142 receives, from the LDSTQ management unit 150, an input of a load store instruction that has not been output to the LDSTQ 161. The RSA 142 further receives, from the LDSTQ management unit 150, an input of an interlock signal together with the returned load store instruction. The RSA 142 interlocks the returned load store instruction, and causes the output of the load store instruction to stand by.

In this process, the RSA 142 continues the output of load store instructions that have not been interlocked to the LDSTQ management unit 150. Thus, load store instructions may be returned to the RSA 142 from the LDSTQ management unit 150 together with an interlock signal. In this case, the RSA 142 interlocks all the returned load store instructions, and causes the output to stand by. This can prevent the RSA 142 from repeatedly issuing the same load store instruction, hindering the issue of other instructions and thereby reducing the processing performance of the core 10, when the LDSTQ 161 is not released for a long time.

After that, the RSA 142 receives an input of an LDSTQ release signal from the LDSTQ 161. Triggered by the input of the LDSTQ release signal, the RSA 142 releases the interlock of all the interlocked load store instructions. The RSA 142 sequentially outputs all the holding load store instructions including reissued load store instructions whose interlock have been released. The RSA 142 corresponds to an example of an "accumulation unit".

The release in the LDSTQ 161 is performed in accordance with the original order of instructions. When a previous load store instruction is not output, an entry to store a subsequent load store instruction therein is not released. Thus, once an LDSTQ release signal is output from the LDSTQ 161, the RSA 142 is highly likely to receive inputs of LDSTQ release signals successively from the LDSTQ 161. In view of this, the RSA 142 releases the interlock of all load store instructions when receiving a single LDSTQ release signal, and is thus capable of outputting in advance a load store instruction with which a release signal is highly likely to be received thereafter. In this manner, a new load store instruction can be stored in the LDSTQ 161 at timing at which the LDSTQ release signal is output, which improves the efficiency of storing load store instructions in the LDSTQ 161. In addition, the release of the interlock does not use the grasp of the number of entries in the LDSTQ 161 or the calculation of free entries in the LDSTQ 161, and hence the increase in number of circuits in the core 10 can be suppressed.

A fixed-point arithmetic unit 151 receives an input of an instruction code from the RSE 141. The fixed-point arithmetic unit 151 receives, from the RSE 141, an input of a fixed-point register number of the writing destination of the arithmetic result. The fixed-point arithmetic unit 151 receives an input of data output from the GPR 152. The fixed-point arithmetic unit 151 performs arithmetic operation in accordance with the instruction code by using data acquired from the GPR 152. After that, the fixed-point arithmetic unit 151 writes the arithmetic result in the GPR 152 at a position designated by the fixed-point register number of the writing destination.

The GPR 152 receives an input of a fixed-point register number from the RSE 141. The GPR 152 outputs data stored in a position indicated by the input fixed-point register number to the fixed-point arithmetic unit 151. After that, the GPR 152 stores the arithmetic result of the fixed-point arithmetic unit 151 in the position indicated by the fixed-point register number of the storage destination designated by the fixed-point arithmetic unit 151.

The GPR 152 receives an input of a fixed-point register number from the RSA 142. The GPR 152 outputs data stored in a position indicated by the input fixed-point register number to a address generation unit 153.

The LDSTQ management unit 150 has information on the number of entries in the LDSTQ 161 in advance. The LDSTQ management unit 150 receives an input of an instruction code of a load store instruction from the RSA 142. The LDSTQ management unit 150 receives an input of an LDSTQ release signal from the LDSTQ 161.

The LDSTQ management unit 150 determines the number of load store instructions held by the LDSTQ 161 on the basis of the number of load store instructions output from the LDSTQ management unit 150 to the LDSTQ 161 and the LDSTQ release signal input from the LDSTQ 161. The LDSTQ management unit 150 determines whether the number of load store instructions held by the LDSTQ 161 is smaller than the number of entries in the LDSTQ 161.

When the number of load store instructions held by the LDSTQ 161 is smaller than the number of entries in the LDSTQ 161, the LDSTQ management unit 150 outputs an instruction code of a load store instruction input from the RSA 142 to the address generation unit 153. On the other hand, when the number of load store instructions held by the LDSTQ 161 is equal to or larger than the number of entries in the LDSTQ 161, the LDSTQ management unit 150 determines that the LDSTQ 161 is full, that is, the LDSTQ 161 has no space to store the load store instruction input from the RSA 142. When the LDSTQ 161 is full, the LDSTQ management unit 150 returns the load store instruction input from the RSA 142 to the RSA 142, and transmits an interlock signal to the RSA 142. The processing of returning the load store instruction input from the RSA 142 to the RSA 142 corresponds to processing where the LDSTQ management unit 150 discards the load store instruction and requests the RSA 142 to retransmit the load store instruction.

The LDSTQ management unit 150 corresponds to an example of "storage management unit" and "storage management circuit".

The address generation unit 153 receives an input of the instruction code of the load store instruction from the LDSTQ management unit 150. The address generation unit 153 further receives an input of values to be used for calculation from the GPR 152. The address generation unit 153 uses the values input from the GPR 152 to generate an address. For example, the address generation unit 153 generates an address by multiplying the value input from the GPR 152 by a predetermined number. The address generation unit 153 outputs the generated address and the instruction code to the LDSTQ 161, and stores the generated address and the instruction code in the LDSTQ 161.

The LDSTQ 161 receives, from the address generation unit 153, an input of the instruction code of the load store instruction and the address to be processed. The LDSTQ 161 stores therein, from the address generation unit 153, instruction codes of load store instructions and addresses to be processed, with its upper limit being the number of entries. The storage of instruction codes of load store instructions and addresses to be processed in the LDSTQ 161 is simply referred to as "storage of load store instructions in LDSTQ 161". The LDSTQ 161 stores load store instructions therein in the order of processing.

The LDSTQ 161 processes load store instructions in the ascending order of processing. Specifically, when the LDSTQ 161 completes the processing of a previous load store instruction, the LDSTQ 161 transmits an address designated by the next load store instruction to the data cache 162 to cause the data cache 162 to execute processing designated by the instruction code. When the LDSTQ 161 completes the processing of the stored load store instructions, the LDSTQ 161 outputs an LDSTQ release signal to the decode unit 13, the RSA 142, and the LDSTQ management unit 150. When the processing of load store instructions is not completed due to cache misses in the data cache 162, load store instructions that have already been output are aborted, and the LDSTQ 161 reissues the same load store instructions. The LDSTQ 161 corresponds to an example of "storage unit".

The data cache 162 receives inputs of instruction codes and addresses from the LDSTQ 161. When the data cache 162 has data corresponding to the designated address, the data cache 162 uses the data to perform processing.

When the input instruction is a load instruction, if data is absent in the designated address, the data cache 162 acquires data from the main memory 2. The data cache 162 stores the acquired data therein, and stores the acquired data in the GPR 152. When the input instruction is a store instruction, the data cache 162 stores the acquired data therein, and stores the acquired data in an address designated by the main memory 2.

Figure 3:
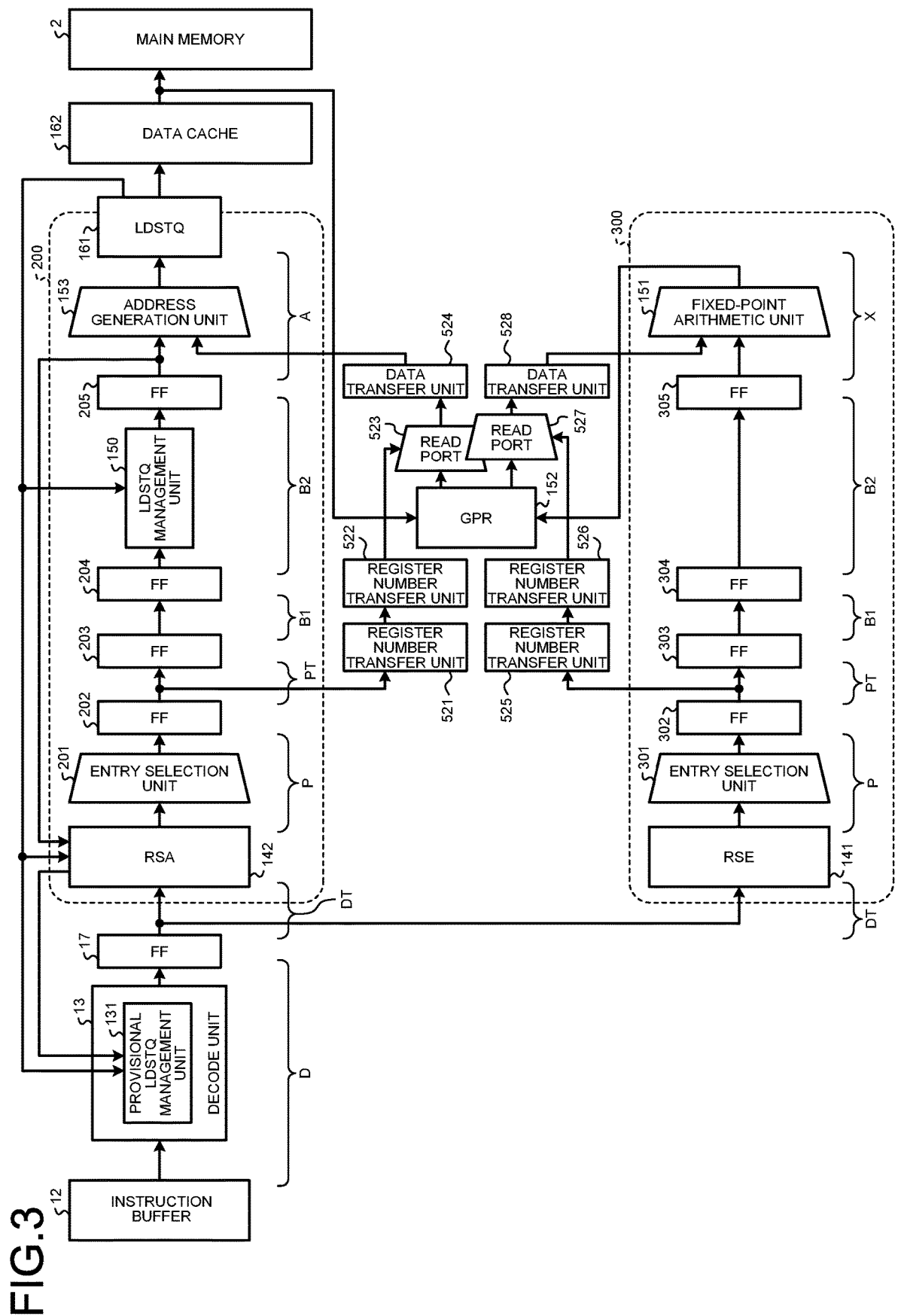
FIG. 3 is a diagram illustrating details of instruction pipelines in a core according to a first embodiment.

Next, the flow of instruction processing is described along processing stages in the instruction pipeline with reference to FIG. 3. FIG. 3 is a diagram illustrating details of an instruction pipeline in the core according to the first embodiment. Specifically, FIG. 3 illustrates the flow of processing of various kinds of instructions in the core 10 according to the first embodiment. A load store pipeline 200 in FIG. 3 represents a path for processing load store instructions. An arithmetic pipeline 300 is a path for processing arithmetic instructions.

The instruction pipeline has processing stages (pipeline stages). Examples of the processing stages include processing stages called "Decode (D) cycle" and "Decode Transfer (DT) cycle". The D cycle and the DT cycle are processing stages common to both load store instructions and arithmetic instructions.

The processing stages further include processing stages called "Priority (P) cycle", "Priority Transfer (PT) cycle", "Buffer (B) 1 cycle", "Buffer (B) 2 cycle", "Address Generate (A) cycle", and "eXecution (X) cycle".

Load store instructions are executed in the load store pipeline 200 having five processing stages of P cycle, PT cycle, B1 cycle, B2 cycle, and A cycle. The load store pipeline 200 corresponds to a path from the RSA 142 to the LDSTQ 161.

Arithmetic instructions are executed in the arithmetic pipeline 300 having five processing stages of P cycle, PT cycle, B1 cycle, B2 cycle, and X cycle. The arithmetic pipeline 300 corresponds to a path from the RSE 141 to the fixed-point arithmetic unit 151.

In the D cycle, the decode unit 13 acquires an instruction from the instruction buffer 12. The decode unit 13 decodes the acquired instruction, and outputs the decoded instruction to a flip flop (FF) 17 in order to transmit the instruction to the RSE 141 or the RSA 142 in the reservation station 14. In the D cycle, the decode unit 13 manages the number of load store instructions output to the LDSTQ 161 and provisionally allocates entries in the LDSTQ 161 to the load store instructions. The provisional allocation as used herein refers to the allocation of identification information obtained by virtually increasing the number of entries in the LDSTQ 161 to load store instructions as virtual entries.

In the DT cycle, the instructions decoded in the D cycle are transferred through the flip flop 17, and stored in the RSE 141 or the RSA 142 in the reservation station 14.

Next, each processing stage in the load store pipeline 200 is described. In the P cycle, a entry selection unit 201 determines instructions to be input to the address generation unit 153 from among instructions stored in the RSA 142 in the reservation station 14. The entry selection unit 201 outputs data on the determined instructions to a flip flop 202.

In the PT cycle, instruction codes of the instructions determined in the P cycle are transferred from the flip flop 202 to a flip flop 203. Fixed-point register numbers of the instructions determined in the P cycle are transmitted to a register number transfer unit 521.

In the B1 cycle and the B2 cycle, the fixed-point register numbers are input from the register number transfer unit 521 to a read port 523 through a register number transfer unit 522. The read port 523 determines data located at the position corresponding to the acquired fixed-point register number as data used for address generation, and reads the data used for address generation from the GPR 152. The read port 523 outputs data used for address generation to a data transfer unit 524. In the B1 cycle and the B2 cycle, the data is delayed by the flip flops 203 to 205 in synchronization with timing at which the data is read from the GPR 152. At the same time, the LDSTQ management unit 150 uses an LDSTQ release signal output from the LDSTQ 161 to check whether an actual entry in the LDSTQ 161 corresponding to the entry provisionally allocated in the D cycle is free. When there is a free entry in the LDSTQ 161, the LDSTQ management unit 150 outputs instruction code input to the address generation unit 153 to the flip flop 205. On the other hand, there is no free entry in the LDSTQ 161, the LDSTQ management unit 150 outputs an instruction code to be returned to the RSA 142 to the flip flop 205, and outputs an interlock signal to the flip flop 205.

In the A cycle, when there is no free entry in the LDSTQ 161, an instruction code that has passed through the flip flop 205 is returned to the RSA 142. In addition, an interlock signal that has passed through the flip flop 205 is transmitted to the RSA 142. On the other hand, when there is a free entry in the LDSTQ 161, an instruction code that has passed through the flip flop 205 is input to the address generation unit 153. In addition, data used for address generation, which is output from the data transfer unit 524, is input to the address generation unit 153. The address generation unit 153 performs address generation, and transmits the generated address and a load store request to the LDSTQ 161. The LDSTQ 161 outputs the address to the data cache 162 to cause the data cache 162 to execute the processing of load store, and then the LDSTQ 161 outputs an LDSTQ release signal to the RSA 142 and the LDSTQ management unit 150.

The LDSTQ management unit 150 uses the number of actual entries in the LDSTQ 161 to determine whether a load store instruction can be allocated to an entry, that is, whether the load store instruction can be stored in the LDSTQ 161. When the load store instruction can be allocated to an entry, a provisional entry given by the decode unit 13 is changed to an actual entry in the LDSTQ 161 by the LDSTQ management unit 150. In this manner, the decode unit 13 allocates provisional entry numbers to load store instructions whose upper limit is the instruction issue upper limit number that is larger than the number of entries in the LDSTQ 161. The LDSTQ management unit 150, disposed in the B2 cycle which is the subsequent processing stage, checks the actual space in the LDSTQ 161. Consequently, the number of cycles from the point when an LDSTQ release signal is output from the LDSTQ 161 until the point when a new load store instruction is allocated to an entry in the LDSTQ 161 can be reduced. In other words, the number of cycles from the point when an entry in the LDSTQ 161 is released until the point when the corresponding free entry is filled can be reduced.

For example, in the case where the decode unit 13 allocates an actual entry in the LDSTQ 161 to a load store instruction, up to seven cycles from the D cycle to the A cycle are provided until a free entry is filled. On the other hand, when the LDSTQ management unit 150 allocates an actual entry in the LDSTQ 161 to a load store instruction, the number of cycles until a free entry is filled can be reduced to up to two cycles of the B2 cycle and the A cycle. Even when the RSA 142 is interlocked, the number of cycles from the point when an LDSTQ release signal is output until the point when a free entry is filled can be reduced to up to five cycles from the P cycle to the A cycle.

The LDSTQ management unit 150 reduces the processing by allocating an actual entry in the LDSTQ 161 to a load store instruction to be stored in the LDSTQ 161 after the load store instruction is selected. For example, in the case where it is determined whether the RSA 142 can convert the provisional allocation into the allocation of an actual entry in the LDSTQ 161, a mechanism is provided that makes determination on every load store instruction held by the RSA 142. The RSA 142 can hold load store instructions corresponding to the instruction issue upper limit number, and hence a mechanism is provided for determination of allocation to actual entries in the LDSTQ 161. When the allocation determination is performed in a stage before the selection of a load store instruction to be stored in the LDSTQ 161 as described above, the circuit scale is increased. It is therefore preferred that the LDSTQ management unit 150 be disposed subsequent to the entry selection unit 201. The LDSTQ management unit 150 can be disposed at any place between the entry selection unit 201 and the address generation unit 153, but it is preferred that the LDSTQ management unit 150 be disposed as close to the address generation unit 153 as possible. This is because as the LDSTQ management unit 150 becomes closer to the address generation unit 153, the number of cycles from the point when an LDSTQ release signal is output until the point when a free entry is filled can be reduced.

Next, each processing stage in the arithmetic pipeline 300 is described. In the P cycle, an entry selection unit 301 determines instructions to be input to the fixed-point arithmetic unit 151 in the arithmetic execution unit 15 from among instructions stored in the RSE 141 in the reservation station 14. The entry selection unit 301 outputs the determined processing to a flip flop 302.

In the PT cycle, instruction codes of the instructions determined in the P cycle are transferred from the flip flop 302 to a flip flop 303. Fixed-point register numbers of the instructions determined in the P cycle are transmitted to a register number transfer unit 525.

In the B1 cycle and the B2 cycle, the fixed-point register numbers are input from the register number transfer unit 525 to a read port 527 through a register number transfer unit 526. The read port 527 determines data located at the position corresponding to the acquired fixed-point register number as data used for address generation, and reads data used for fixed-point arithmetic from the GPR 152. The read port 527 outputs data used for fixed-point arithmetic to a data transfer unit 528. In the B1 cycle and the B2 cycle, the instruction code transmitted to the fixed-point arithmetic unit 151 is delayed by the flip flops 303 to 305 in synchronization with timing at which data is read from the GPR 152.

In the X cycle, an instruction code of fixed-point arithmetic is input from the flip flop 305 to the fixed-point arithmetic unit 151. In addition, data used for fixed-point arithmetic, which is output from the data transfer unit 528, is input to the fixed-point arithmetic unit 151. The fixed-point arithmetic unit 151 performs fixed-point arithmetic, and stores the arithmetic result in the GPR 152 at a position indicated by the fixed-point register number of the storage destination.

Figure 4:
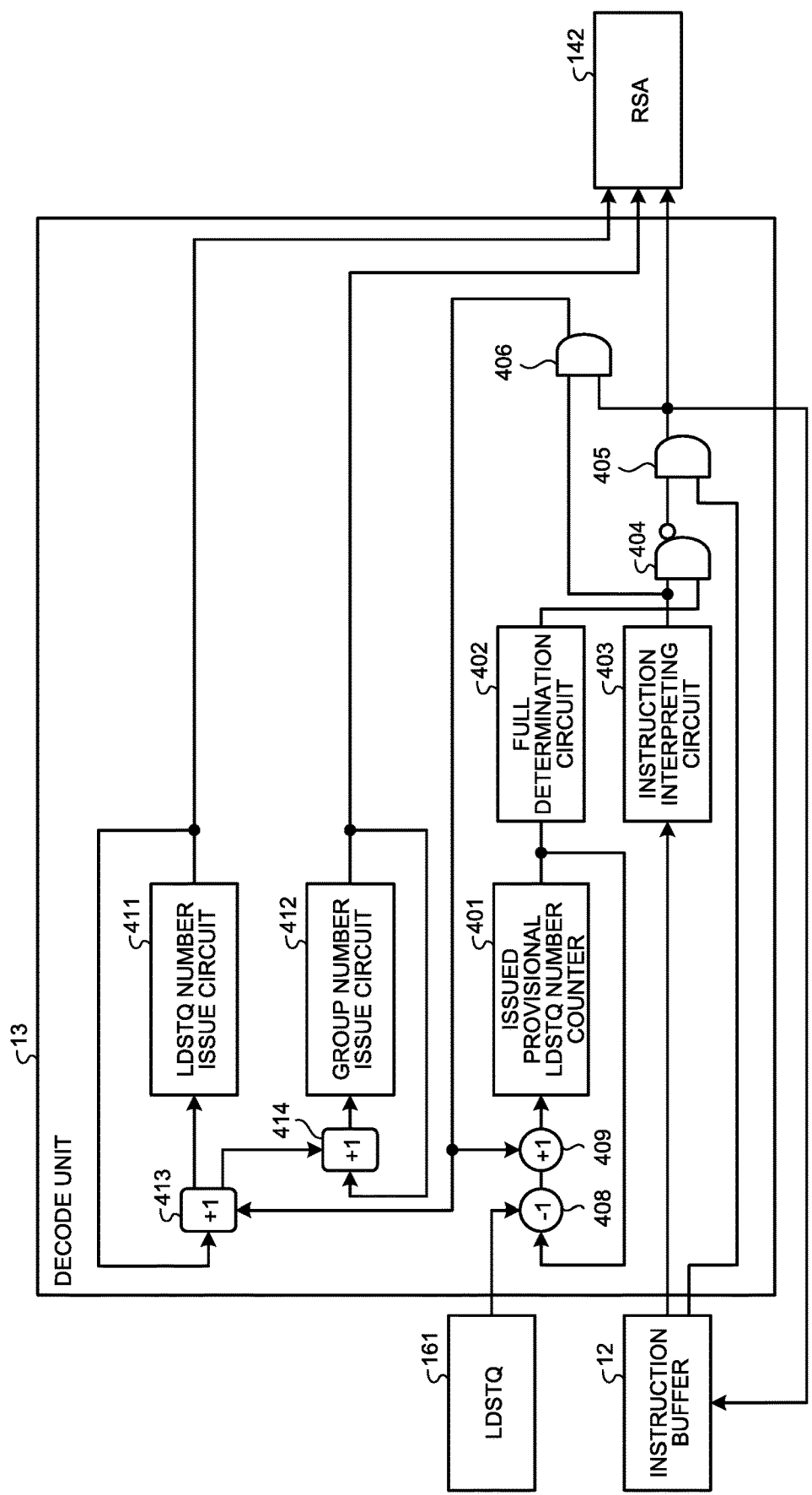
FIG. 4 is a block diagram illustrating an exemplary circuit configuration of a decode unit.

Next, an exemplary specific circuit in the decode unit 13 for the provisional allocation of entries in the LDSTQ 161 to load store instructions and the issuance of load store instructions to the RSA 142 is described with reference to FIG. 4. FIG. 4 is a block diagram illustrating an exemplary circuit configuration of the decode unit.

In the first embodiment, as the provisional allocation of entries in the LDSTQ 161 to load store instructions, the decode unit 13 allocates provisional LDSTQ numbers represented by a pair of LDSTQ numbers whose upper limit is the number of entries in the LDSTQ 161 and a group number to load store instructions. In the following description, the number of entries in the LDSTQ 161 is 10, and the instruction issue upper limit number is 40, which is four times as many as the number of entries in the LDSTQ 161. In other words, the instruction issue upper limit number is 40.

An instruction interpreting circuit 403 determines whether an instruction input from the instruction buffer 12 is an arithmetic instruction or a load store instruction. When the instruction is an arithmetic instruction, the instruction interpreting circuit 403 outputs 0 to a Not AND (NAND) gate 404 and an AND gate 406. When the instruction is a load store instruction, the instruction interpreting circuit 403 outputs 1 to the NAND gate 404 and the AND gate 406.

An issued provisional LDSTQ number counter 401 is a counter that counts the number of provisional LDSTQ numbers issued from the decode unit 13 and issued for load store instructions whose processing has not been completed in the LDSTQ 161, that is, the queued number of load store instructions. The issued provisional LDSTQ number counter 401 receives an input of the calculation results of a subtractor 408 and an adder 409. The issued provisional LDSTQ number counter 401 determines a count value obtained by adding the input value to the value of the issued provisional LDSTQ number counter 401 as the queued number of load store instructions. The issued provisional LDSTQ number counter 401 outputs the calculated queued number of load store instructions to a Full determination circuit 402, and further outputs a signal indicating the count value to the subtractor 408.

The Full determination circuit 402 receives, from the issued provisional LDSTQ number counter 401, an input of the number of provisional LDSTQ numbers issued from the decode unit 13 and issued for load store instructions whose processing has not been completed in the LDSTQ 161, that is, the queued number of load store instructions. The Full determination circuit 402 determines whether the queued number of load store instructions is 40, which is the instruction issue upper limit number. When the queued number of load store instructions is not 40, the Full determination circuit 402 outputs 0 to the NAND gate 404. On the other hand, when the queued number of load store instructions is 40, the Full determination circuit 402 outputs 1 to the NAND gate 404.

The NAND gate 404 receives, from the instruction interpreting circuit 403, an input of a signal indicating whether the instruction is a load store instruction. The NAND gate 404 receives, from the Full determination circuit 402, a signal indicating whether the queued number of load store instructions has reached the instruction issue upper limit number. The NAND gate 404 outputs negative AND of the two input signals. Specifically, when the instruction is a load store instruction and when the queued number of load store instructions has not reached the instruction issue upper limit number, the NAND gate 404 outputs 0 to an AND gate 405 as a signal indicating that the load store instruction has been issued, and in the other case, outputs 1 to the AND gate 405 as a signal indicating that the load store instruction has not been issued.

The AND gate 405 receives an input of a signal indicating whether an instruction has been input from the instruction buffer 12, that is, an effective signal indicating whether an effective instruction has been input from the instruction buffer 12. The AND gate 405 receives an input of 1 when an instruction has been input from the instruction buffer 12, and receives an input of 0 when there is no input of instructions from the instruction buffer 12. The AND gate 405 receives, from the NAND gate 404, an input of a signal indicating whether a load store instruction has been issued. The AND gate 405 outputs logical AND of the two input signals. Specifically, the AND gate 405 outputs 1 to the AND gate 406 and the RSA 142 when an instruction is input from the instruction buffer 12 and a load store instruction is issued, and in the other case, outputs 0 to the AND gate 406, the RSA 142, and the instruction buffer 12. When the instruction buffer 12 receives an input of a signal of 1 from the AND gate 405, the instruction buffer 12 outputs the next instruction.

The AND gate 406 receives, from the instruction interpreting circuit 403, an input of a signal indicating whether the instruction is a load store instruction. The AND gate 406 further receives, from the AND gate 405, an input of a signal indicating whether the instruction output from the instruction buffer 12 is a load store instruction. The AND gate 406 outputs logical AND of the two input signals. Specifically, when an instruction is input from the instruction buffer 12, when the instruction is a load store instruction, and when the load store instruction is issued, the AND gate 406 outputs 1 to the adders 409 and 413, and in the other cases, outputs 0 to the adders 409 and 413.

The subtractor 408 receives an input of a signal indicating the output of the count value output from the issued provisional LDSTQ number counter 401. The subtractor 408 further receives an input of an LDSTQ release signal from the LDSTQ 161. When the subtractor 408 does not receive an input of the LDSTQ release signal, the subtractor 408 outputs 0 to the adder 409 in response to the input of the signal indicating the output of the count value. On the other hand, when the subtractor 408 receives an input of the LDSTQ release signal, the subtractor 408 outputs −1 to the adder 409 in response to the input of the signal indicating the output of the count value.

The adder 409 receives an input of the calculation result of the subtractor 408. The adder 409 further receives, from the AND gate 406, an input of a signal indicating whether an instruction is input from the instruction buffer 12, whether the instruction is a load store instruction, and whether the load store instruction is issued. When the adder 409 receives an input of a signal indicating that the load store instruction input from the instruction buffer 12 is issued, the adder 409 outputs a value obtained by adding 1 to the value input from the subtractor 408 to the issued provisional LDSTQ number counter 401. On the other hand, when the adder 409 receives an input of a signal indicating that the load store instruction input from the instruction buffer 12 is not issued, the adder 409 outputs the value input from the subtractor 408 directly to the issued provisional LDSTQ number counter 401. Specifically, the counter in the issued provisional LDSTQ number counter 401 is incremented by 1 when a load store instruction is issued from the decode unit 13, and is decremented by 1 when an LDSTQ release signal is output from the LDSTQ 161.

An LDSTQ number issue circuit 411 issues successive LDSTQ numbers from 0 to 9 in sequence. The LDSTQ number issue circuit 411 receives an input of the addition result from the adder 413. The LDSTQ number issue circuit 411 adds the input value to the LDSTQ number, and issues the resultant value as the next LDSTQ number. When the LDSTQ number issue circuit 411 issues 9 as an LDSTQ number, the LDSTQ number issue circuit 411 next issues 0 as an LDSTQ number. When the LDSTQ number issue circuit 411 issues the LDSTQ number to the RSA 142, an increment signal is input to the adder 413.

The adder 413 receives an input of the increment signal output from the LDSTQ number issue circuit 411. The adder 413 further receives, from the AND gate 406, an input of a signal indicating whether an instruction is input from the instruction buffer 12, whether the instruction is a load store instruction, and whether the load store instruction is issued. When the adder 413 receives an input of a signal indicating that the load store instruction input from the instruction buffer 12 is issued, the adder 413 outputs 1 in response to the input of the increment signal. Specifically, when a load store instruction input from the instruction buffer 12 is issued, the LDSTQ number issued from the LDSTQ number issue circuit 411 is increased by 1. The adder 413 outputs an overflow signal to an adder 414 at the time of outputting a signal having a value of 1 for the tenth time, that is, at timing at which the LDSTQ number issued from the LDSTQ number issue circuit 411 changes from 9 to 0.

A group number issue circuit 412 issues successive group numbers from 0 to 3 in sequence. The instruction issue upper limit number is four times as many as the number of entries in the LDSTQ 161, and hence the upper limit of the group number is 3. The group number issue circuit 412 receives an input of the addition result from the adder 414. The group number issue circuit 412 adds the input value to the group number, and issues the resultant value as the next group number. When the group number issue circuit 412 issues 3 as a group number, the group number issue circuit 412 next issues 0 as a group number. When the group number issue circuit 412 issues the group number to the RSA 142, an increment signal is input to the adder 414.

The adder 414 receives an input of the increment signal output from the group number issue circuit 412. The adder 414 further receives an input of the overflow signal from the adder 413. In the case where the input of the overflow signal is received, the adder 413 outputs 1 when the increment signal is input. Specifically, when the LDSTQ number has reached 9, the LDSTQ number next returns to 0, and the group number is incremented by 1.

The RSA 142 receives, from the LDSTQ number issue circuit 411, an input of an LDSTQ number input from the LDSTQ number issue circuit 411. The RSA 142 receives an input of a group number input from the group number issue circuit 412. The RSA 142 further receives, from the AND gate 405, an input of a signal indicating that an instruction has been input from the instruction buffer 12 and a load store instruction has been issued. The RSA 142 acquires, as a provisional LDSTQ number, a value obtained by arranging the group number input from the group number issue circuit 412 in juxtaposition with the LDSTQ number input from the LDSTQ number issue circuit 411. Specifically, in this case, the provisional LDSTQ numbers are numbers from 00 to 39.

Figure 5:
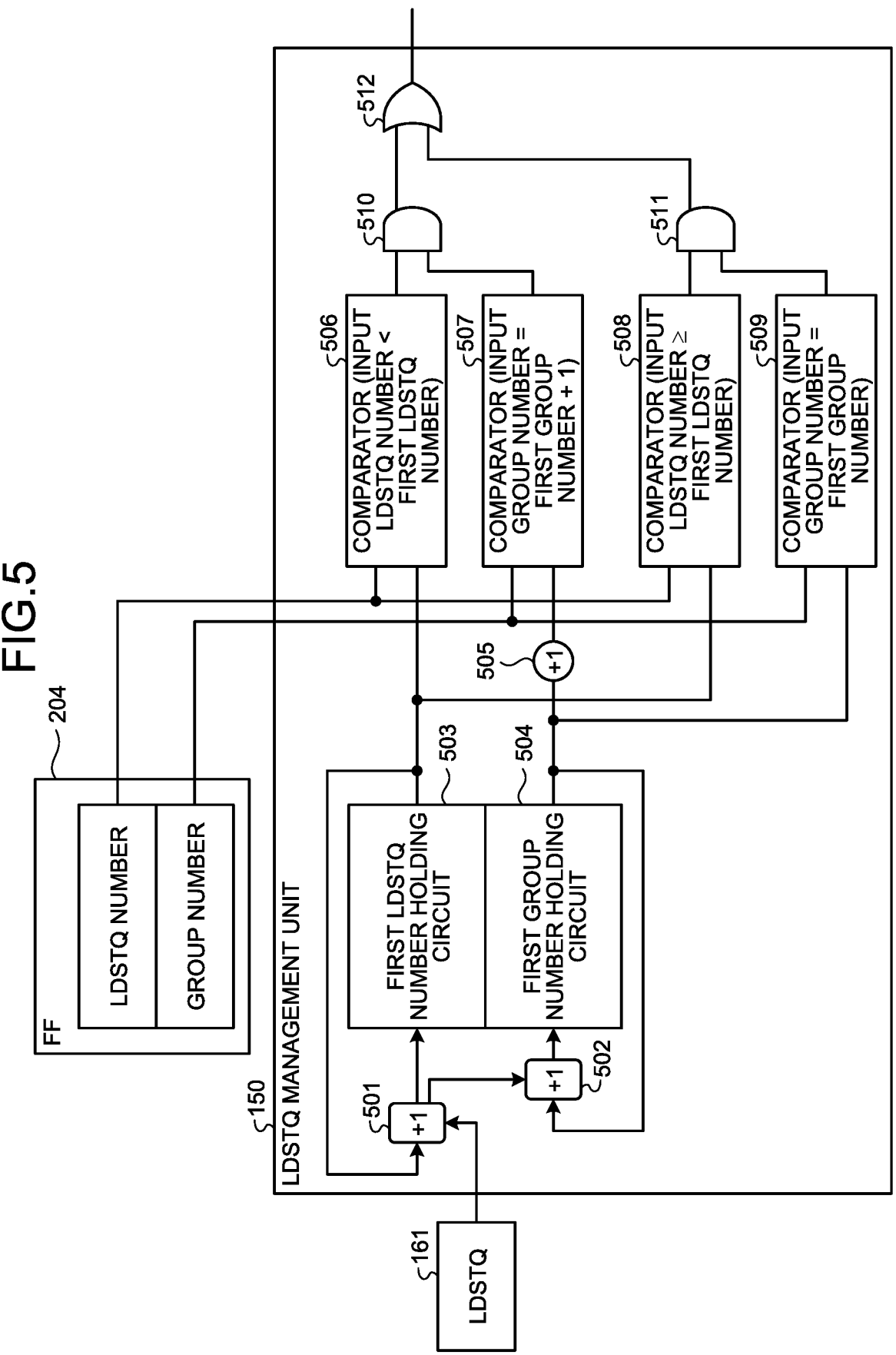
FIG. 5 is a block diagram illustrating an exemplary circuit configuration of an LDSTQ management unit.

Next, referring to FIG. 5, an example of an actual specific circuit for allocating entries in the LDSTQ 161 by the LDSTQ management unit 150 is described. FIG. 5 is a block diagram illustrating an example of the circuit configuration of the LDSTQ management unit.

A first LDSTQ number holding circuit 503 is a circuit that holds a first LDSTQ number, which is the first number of the LDSTQ number constituting provisional LDSTQ numbers allocated to load store instructions stored in the LDSTQ 161 at that time point. The initial value of the first LDSTQ number is 0. The first LDSTQ number holding circuit 503 receives an input of the addition result from an adder 501. The first LDSTQ number holding circuit 503 adds the value input from the adder 501 to the held first LDSTQ number to generate the next first LDSTQ number. The first LDSTQ number holding circuit 503 outputs the generated first LDSTQ number to a comparator 506 and a comparator 508. When the first LDSTQ number holding circuit 503 outputs a first LDSTQ number, an increment signal is input to the adder 501.

The adder 501 receives an input of an LDSTQ release signal from the LDSTQ 161. The adder 501 receives an input of the increment signal output from the first LDSTQ number holding circuit 503. When the input of the increment signal is received in the state in which the input of the LDSTQ release signal has been received, the adder 501 outputs 1. Specifically, when the release signal is output from the LDSTQ 161, the first LDSTQ number is incremented by 1. The adder 501 outputs an overflow signal to an adder 502 at the time of outputting a signal having a value of 1 for the tenth time, that is, at timing at which the first LDSTQ number changes from 9 to 0.

A first group number holding circuit 504 is a circuit that holds a first group number, which is the first number of the group number constituting provisional LDSTQ numbers allocated to load store instructions stored in the LDSTQ 161 at that time point. The initial value of the first group number is 0. The first group number holding circuit 504 issues successive group numbers from 0 to 3 in sequence. The first group number holding circuit 504 receives an input of the addition result from the adder 502. The first group number holding circuit 504 adds the input value to the first group number, and issues the resultant value to an adder 505 and a comparator 509 as the next first group number. When the first group number holding circuit 504 issues 3 as a first group number, the first group number holding circuit 504 issues 0 next as a first group number. When the first group number holding circuit 504 issues a first group number, an increment signal is input to the adder 502.

The adder 502 receives an input of the increment signal output from the first group number holding circuit 504. The adder 502 further receives an input of an overflow signal from the adder 501. In the case where the input of the overflow signal is received, the adder 502 outputs 1 when the increment signal is input. Specifically, when the first LDSTQ number reaches 9, the first LDSTQ number next returns to 0, and the first group number is incremented by 1.

The adder 505 adds 1 to the first group number input from the first group number holding circuit 504, and outputs the resultant value to a comparator 507.

A flip flop (FF) 204 holds a provisional LDSTQ number allocated to a load store instruction output from the RSA 142. As illustrated in FIG. 5, the provisional LDSTQ number is constituted by an LDSTQ number and a group number.

The comparator 506 receives an input of the LDSTQ number constituting the provisional LDATQ number held by the flip flop 204. In the following, an LDSTQ number constituting a provisional LDSTQ number allocated to a load store instruction output from the RSA 142 is referred to as "input LDSTQ number". The comparator 506 further receives an input of the first LDSTQ number from the first LDSTQ number holding circuit 503. The comparator 506 compares the input LDSTQ number with the first LDSTQ number. When the input LDSTQ number is smaller than the first LDSTQ number, the comparator 506 outputs 1 to an AND gate 510, and otherwise outputs 0 to the AND gate 510.

The comparator 507 receives an input of the group number constituting the provisional LDATQ number held by the flip flop 204. In the following, a group number constituting a provisional LDSTQ number allocated to a load store instruction output from the RSA 142 is referred to as "input group number". The comparator 507 further receives, from the adder 505, an input of a number obtained by adding 1 to the first group number. The comparator 507 compares the input group number with the number obtained by adding 1 to the first group number. When the input group number matches the number obtained by adding 1 to the first group number, the comparator 507 outputs 1 to the AND gate 510, and otherwise outputs 0 to the AND gate 510.

The AND gate 510 receives, from the comparator 506, an input of a signal indicating whether the input LDSTQ number is smaller than the first LDSTQ number. The AND gate 510 further receives, from the comparator 507, an input of information indicating whether the input group number matches the number obtained by adding 1 to the first group number. The AND gate 510 outputs logical AND of the two input signals. Specifically, the AND gate 510 outputs 1 when the input group number matches the value obtained by adding 1 to the first group number and when the input LDSTQ number is smaller than the first LDSTQ number.

The comparator 508 receives an input of the input LDSTQ number from the flip flop 204. The comparator 508 further receives an input of the first LDSTQ number from the first LDSTQ number holding circuit 503. The comparator 506 compares the input LDSTQ number with the first LDSTQ number. When the input LDSTQ number is equal to or larger than the first LDSTQ number, the comparator 506 outputs 1 to the AND gate 510, and otherwise outputs 0 to the AND gate 510.

The comparator 509 receives an input of the input group number from the flip flop 204. The comparator 509 further receives an input of the first group number from the first group number holding circuit 504. The comparator 509 compares the input group number with the first group number. When the input group number matches the first group number, the comparator 509 outputs 1 to an AND gate 511, and otherwise outputs 0 to the AND gate 511.

The AND gate 511 receives, from the comparator 508, an input of a signal indicating whether the input LDSTQ number is equal to or larger than the first LDSTQ number. The AND gate 511 further receives, from the comparator 509, an input of information indicating whether the input group number matches the first group number. The AND gate 511 outputs logical AND of the two input signals. Specifically, the AND gate 511 outputs 1 when the input group number matches the first group number and when the input LDSTQ number is equal to or larger than the first LDSTQ number.

An OR gate 512 receives, from the AND gate 510, an input of a signal indicating whether the input group number matches the value obtained by adding 1 to the first group number and whether the input LDSTQ number is smaller than the first LDSTQ number. The OR gate 512 receives, from the AND gate 511, an input of a signal indicating whether the input group number matches the first group number and whether the input LDSTQ number is equal to or larger than the first LDSTQ number. The OR gate 512 outputs logical OR of the two input signals. Specifically, the OR gate 512 outputs 1 when the input group number matches the value obtained by adding 1 to the first group number and when the input LDSTQ number is smaller than the first LDSTQ number. The OR gate 512 further outputs 1 when the input group number matches the first group number and when the input LDSTQ number is equal to or larger than the first LDSTQ number. The signal of 1 output from the OR gate 512 is a signal indicating that load store instructions output from the RSA 142 and stored in the flip flop 204 can be stored in the LDSTQ 161.

Now, referring to FIG. 6, the reason why a load store instruction output from the RSA 142 and stored in the flip flop 204 can be stored in the LDSTQ 161 when the OR gate 512 in FIG. 5 outputs 1 is described. FIG. 6 is a conceptual diagram illustrating data stored in the LDSTQ.

Provisional LDSTQ numbers 600 to 604 represent all provisional LDSTQ numbers issued from the decode unit 13. Frames 611 to 614 arranged in the provisional LDSTQ numbers 602 to 604, respectively, represent provisional LDSTQ numbers allocated to load store instructions stored in the LDSTQ 161 in the respective states. The provisional LDSTQ numbers are represented by two-digit numbers, where the first digit represents a group number and the second digit represents an LDSTQ number. In addition, provisional LDSTQ numbers with "FIRST" included in the frames 611 to 614 are provisional LDSTQ numbers of first load store instructions among load store instructions stored in the LDSTQ 161. Specifically, the group number of a provisional LDSTQ number with "FIRST" corresponds to the first group number, and the LDSTQ number thereof corresponds to the first LDSTQ number.

Load store instructions are allocated with provisional LDSTQ numbers from 00 and are sequentially stored in the LDSTQ 161. First, load store instructions having provisional LDSTQ numbers from 00 to 09 are stored in the LDSTQ 161. In practice, load store instructions allocated with LDSTQ numbers indicating entries in the LDSTQ 161 are stored in the LDSTQ 161. The following description, however, uses provisional LDSTQ numbers before being allocated to actual entries in the LDSTQ 161.

When a load store instruction having a provisional LDSTQ number of 00 is output in the state of the provisional LDSTQ number 601 and released and then the next load store instruction is stored, the state indicated by the provisional LDSTQ number 602 is obtained. In this case, the provisional LDSTQ number next to a provisional LDSTQ number of 09 is 10, and hence load store instructions having provisional LDSTQ numbers included in the frame 612 in the provisional LDSTQ number 602 are stored in the LDSTQ 161. By repeating the release of entries and the storage of new load store instructions in this manner, the states indicated by the provisional LDSTQ numbers 603 and 604 are obtained.

In any state, the group number of a load store instruction stored in the LDSTQ 161 is the first group number or a number obtained by adding 1 to the first group number. When the group number matches the first group number, load store instructions allocated with provisional LDSTQ numbers including LDSTQ numbers equal to or larger than the first LDSTQ number can be stored in the LDSTQ 161. When the group number matches a number obtained by adding 1 to the first group number, load store instructions allocated with provisional LDSTQ numbers including LDSTQ numbers smaller than the first LDSTQ number can be stored in the LDSTQ 161. Thus, it can be said that when the OR gate 512 in FIG. 5 outputs 1, a load store instruction output from the RSA 142 and stored in the flip flop 204 at that time can be stored in the LDSTQ 161.

Figure 7:
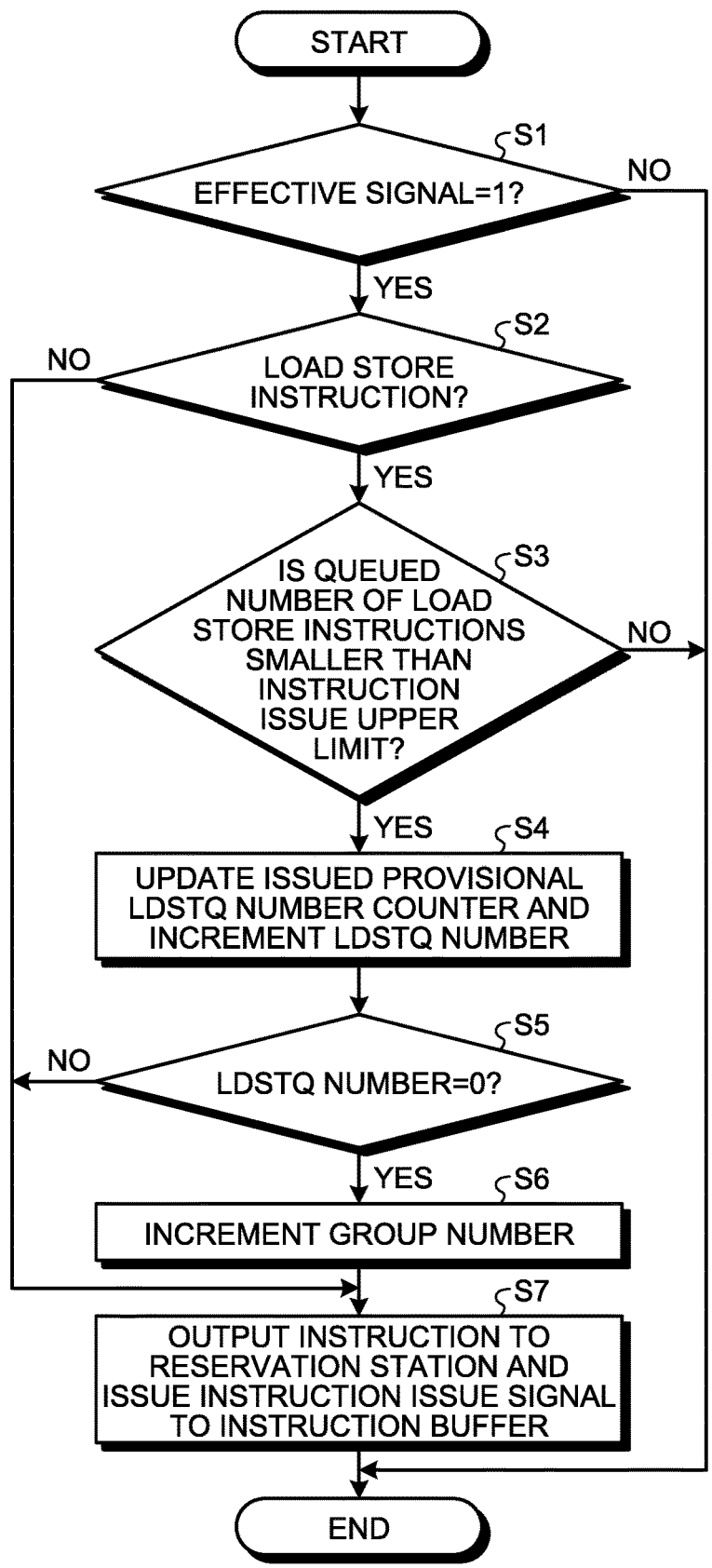
FIG. 7 is a flowchart of instruction issue processing in the decode unit.

Now, the flow of instruction issue processing in the decode unit 13 is described with reference to FIG. 7. FIG. 7 is a flowchart of the instruction issue processing in the decode unit.

The decode unit 13 determines whether an input of a signal indicating that instructions have been output from the instruction buffer 12, that is, an effective signal having a value of 1, has been received (Step S1). This processing corresponds to processing where the AND gate 405 in FIG. 4 receives an input of the signal from the instruction buffer 12. When there is no input of an effective signal having a value of 1 (negative at Step S1), the decode unit 13 finishes the instruction issue processing without outputting instructions to the reservation station 14. This corresponds to processing where the AND gate 405 outputs 0.

On the other hand, when there is an input of an effective signal having a value of 1 (positive at Step S1), the decode unit 13 interprets the instruction to determine whether the input instruction is a load store instruction (Step S2). This processing corresponds to processing where the NAND gate 404 in FIG. 4 receives an input of the interpretation result of the instruction by the instruction interpreting circuit 403. When the input instruction is not a load store instruction (negative at Step S2), the decode unit 13 proceeds to Step S7.

On the other hand, when the input instruction is a load store instruction (positive at Step S2), the decode unit 13 determines whether the queued number of load store instructions is smaller than an instruction issue upper limit (Step S3). This processing corresponds to processing where the NAND gate 404 in FIG. 4 receives an input of the signal indicating the determination result from the Full determination circuit 402. When the queued number of load store instructions is equal to or larger than the instruction issue upper limit (negative at Step S3), the decode unit 13 finishes the instruction issue processing without outputting the instruction to the reservation station 14. This processing corresponds to processing where the NAND gate 404 outputs 0 and the AND gate 405 outputs 0 in response thereto.

On the other than, when the queued number of load store instructions is smaller than the instruction issue upper limit (positive at Step S3), the decode unit 13 increments the LDSTQ number (Step S4). This processing corresponds to the updating of the issued provisional LDSTQ number counter 401 and the incrementing of the LDSTQ number by the LDSTQ number issue circuit 411 in FIG. 4.

Next, the decode unit 13 determines whether the LDSTQ number is 0 (Step S5). This processing corresponds to the output determination of the overflow signal in the adder 413. When the LDSTQ signal is not 0 (negative at Step S5), the decode unit 13 proceeds to Step S7. This corresponds to the case where the adder 413 does not output an overflow signal in FIG. 4.

On the other hand, when the LDSTQ signal is 0 (positive at Step S5), the decode unit 13 increments the group number (Step S6). This processing corresponds to processing where the group number issue circuit 412 increments the group number when the adder 414 in FIG. 4 outputs 1 in response to the input of the overflow signal from the adder 413.

After that, the decode unit 13 outputs a provisional LDSTQ number, outputs an instruction to the reservation station 14, and further issues an instruction issue signal to the instruction buffer 12 (Step S7).

Figure 8:
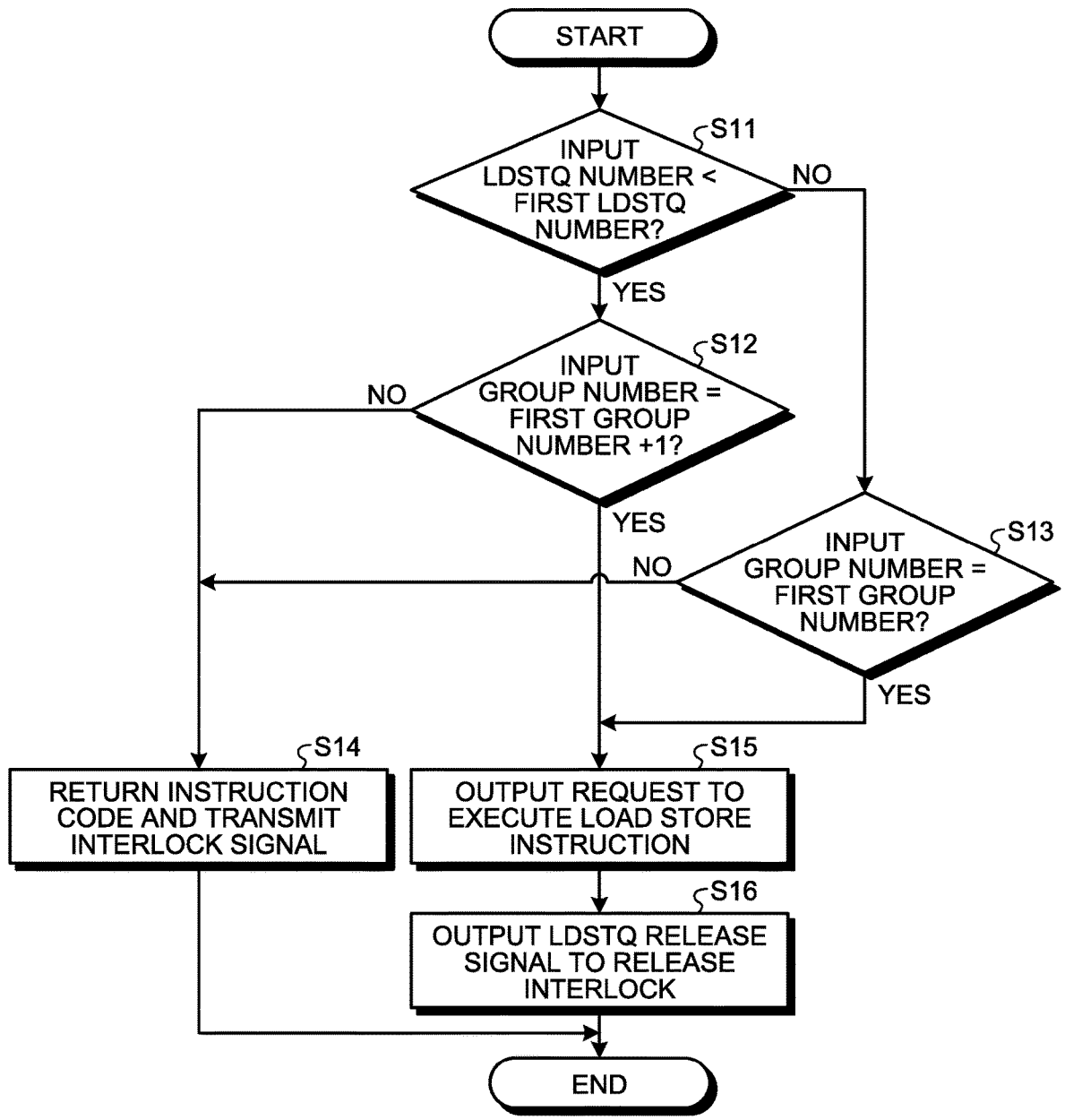
FIG. 8 is a flowchart of request issue processing in the LDSTQ management unit according to the first embodiment.

Next, the flow of request issue processing in the LDSTQ management unit 150 is described with reference to FIG. 8. FIG. 8 is a flowchart of the request issue processing in the LDSTQ management unit according to the first embodiment.

The LDSTQ management unit 150 determines whether an input LDSTQ number is smaller than a first LDSTQ number (Step S11). This processing corresponds to the determination processing by the comparators 506 and 508 in FIG. 5.

When the input LDSTQ number is smaller than the first LDSTQ number (positive at Step S11), the LDSTQ management unit 150 determines whether an input group number matches a number obtained by adding 1 to a first group number (Step S12). This processing corresponds to the determination processing by the comparator 507 in FIG. 5.

When the input LDSTQ number is equal to or larger than the first LDSTQ number (negative at Step S11), the LDSTQ management unit 150 determines whether the input group number matches the first group number (Step S13). This processing corresponds to the determination processing by the comparator 509 in FIG. 5.

When the input group number does not match the number obtained by adding 1 to the first group number (negative at Step S12) or when the input group number does not match the first group number (negative at Step S13), the LDSTQ management unit 150 determines that the instruction is not storable in the LDSTQ 161. This processing corresponds to the case where the OR gate 512 in FIG. 5 outputs a signal indicating a value of 0. The LDSTQ management unit 150 returns an instruction code to the RSA 142, and further transmits an interlock signal to the RSA 142 (Step S14).

On the other hand, when the input group number matches the number obtained by adding 1 to the first group number (positive at Step S12) or when the input group number matches the first group number (positive at Step S13), the LDSTQ management unit 150 determines that the instruction can be stored in the LDSTQ 161. This processing corresponds to the case where the OR gate 512 in FIG. 5 outputs a signal indicating a value of 1. The LDSTQ management unit 150 allocates an LDSTQ number corresponding to the actual entry in the LDSTQ 161 to the load store instruction. The LDSTQ management unit 150 stores the instruction code in a position in the LDSTQ 161 indicated by the LDSTQ number, and outputs a request to execute the load store instruction to the LDSTQ 161 (Step S15).

After that, the LDSTQ management unit 150 outputs an interlock release signal to release the interlock of the RSA 142. After the processing of the load store instruction is completed, the LDSTQ 161 outputs an LDSTQ release signal (Step S16).

As described above, in the core according to the first embodiment, the decode unit allocates provisional LDSTQ numbers to load store instructions equal to or larger than the number of entries in the LDSTQ, and outputs the resultant load store instructions to the RSA. In the core, the LDSTQ management unit determines whether a load store instruction allocated with a provisional LDSTQ number can be stored in the actual LDSTQ. When the load store instruction can be stored, the LDSTQ management unit allocates an entry in the LDSTQ. When there is no space to store the load store instruction, the LDSTQ management unit returns the load store instruction to the RSA. In this manner, the decode unit that outputs instructions in accordance with the processing order can output load store instructions equal to or larger than the number of entries in the LDSTQ. Thus, the possibility that the issue of load store instructions from the decode unit is caused to stand by can be reduced such that a larger number of load store instructions and arithmetic instructions can be processed to improve the use efficiency of the address generation unit and the fixed-point arithmetic unit.

When the LDSTQ release signal is output, a load store instruction to be stored in the LDSTQ is output from the LDSTQ management unit or the RSA, and hence the period to store the instruction in the LDSTQ can be shortened as compared with the case of waiting for the arrival of a load store instruction output from the decode unit. Consequently, the use efficiency of the address generation unit and the fixed-point arithmetic unit can be improved.

The determination of whether an instruction can be stored in the LDSTQ by the LDSTQ management unit is performed for a single load store instruction output from the RSA, and hence the circuit scale can be reduced. Furthermore, the release of the interlock of the RSA and the determination of whether an instruction can be stored in the LDSTQ by the LDSTQ management unit are achieved with use of an existing LDSTQ release signal, and hence the circuit scale for implementing this processing can be reduced.

When the LDSTQ has no space to store a load store instruction, the RSA is interlocked such that the output of the load store instruction from the RSA is caused to stand by. Consequently, the burden of repeatedly processing the same load store instruction can be reduced to improve the use efficiency of the address generation unit and the fixed-point arithmetic unit.

However, in the case where the reduction in processing performance caused by repeated processing of the same load store instruction can be permitted, the interlock of the RSA may be omitted. Also in this case, the output of instructions from the decode unit can be increased and the period from the release of an entry in the LDSTQ to the next allocation of the entry can be shortened to improve the use efficiency of the arithmetic unit.

[b] Second Embodiment

Next, a second embodiment is described. Unlike the first embodiment, a core according to the second embodiment prefetches a load store instruction when the LDSTQ has no space to store the load store instruction. A core 10 according to the second embodiment is also illustrated by the block diagram in FIG. 2. In the following description, description of the same operations of the units as those in the first embodiment is omitted.

Figure 9:
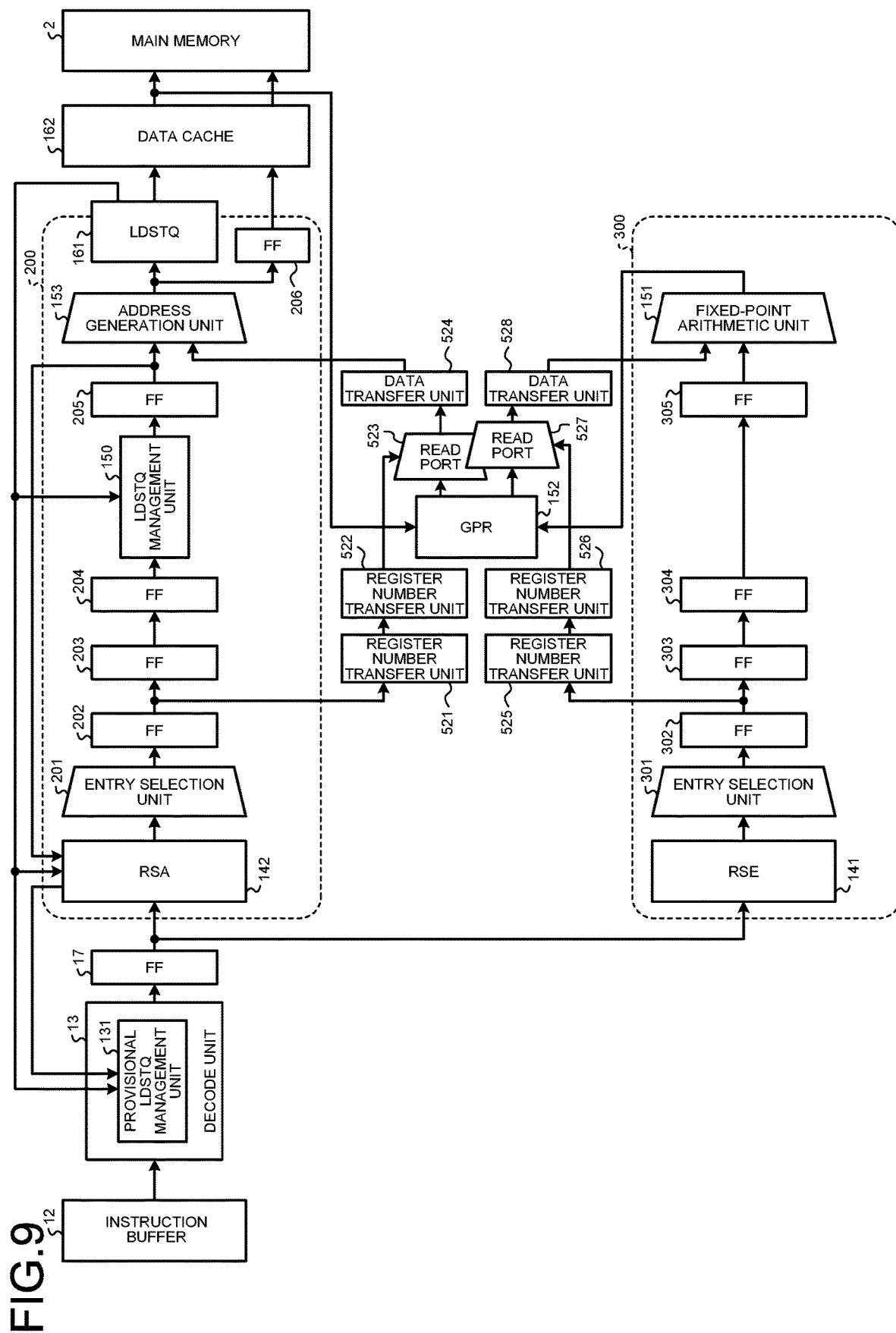
FIG. 9 is a diagram illustrating details of instruction pipelines in a core according to a second embodiment.

FIG. 9 is a diagram illustrating details of instruction pipelines in the core according to the second embodiment. In a load store pipeline 200 according to the second embodiment, a bypass path connected from the address generation unit 153 to the data cache 162 while bypassing the LDSTQ 161 is provided.

When an acquired load store instruction can be stored in the LDSTQ 161, the LDSTQ management unit 150 outputs an instruction code of the load store instruction to the address generation unit 153 through the flip flop (FF) 205. In this case, the LDSTQ management unit 150 causes the address generation unit 153 to process the load store instruction.

On the other hand, when the LDSTQ 161 has no space to store the acquired load store instructions, the LDSTQ management unit 150 outputs the instruction code of the load store instruction to the address generation unit 153 through the flip flop 205. The LDSTQ management unit 150 causes the address generation unit 153 to process the load store instruction as prefetching. The LDSTQ management unit 150 returns the instruction code of the load store instruction to the RSA 142, and transmits an interlock signal to the RSA 142.

When the load store instruction can be stored in the LDSTQ 161, the address generation unit 153 receives an input of the instruction code from the LDSTQ management unit 150. The address generation unit 153 generates an address by using the acquired instruction code and information acquired from the GPR 152. The address generation unit 153 transmits the instruction code and the generated address to the LDSTQ 161 to cause the LDSTQ 161 to store and process the load store instruction.

On the other hand, when the LDSTQ 161 has no space to store the load store instruction, the address generation unit 153 receives an input of the instruction code from the LDSTQ management unit 150. The address generation unit 153 further receives a request to process the load store instruction as prefetching from the LDSTQ management unit 150. The address generation unit 153 generates an address by using the acquired instruction code and information acquired from the GPR 152. After that, the address generation unit 153 transmits the generated address on the main memory 2 to the data cache through a flip flop 206 to cause the data cache 162 to prefetch data stored in the generated address. For example, when data on the generated address on the main memory 2 has not been stored in the data cache 162, the address generation unit 153 stores data read from the generated address on the main memory 2 into the data cache 162.

Next, the flow of request issue processing in the LDSTQ management unit 150 according to the second embodiment is described with reference to FIG. 10. FIG. 10 is a flowchart of the request issue processing in the LDSTQ management unit according to the second embodiment.

The LDSTQ management unit 150 determines whether an input LDSTQ number is smaller than a first LDSTQ number (Step S21).

When the input LDSTQ number is smaller than the first LDSTQ number (positive at Step S21), the LDSTQ management unit 150 determines whether an input group number matches a number obtained by adding 1 to a first group number (Step S22).

When the input LDSTQ number is equal to or larger than the first LDSTQ number (negative at Step S21), the LDSTQ management unit 150 determines whether the input group number matches the first group number (Step S23).

When the input group number does not match the number obtained by adding 1 to the first group number (negative at Step S22) or when the input group number does not match the first group number (negative at Step S23), the LDSTQ management unit 150 determines that the acquired instruction is not storable in the LDSTQ 161. The LDSTQ management unit 150 transmits a prefetch request to the address generation unit 153 together with an instruction code (Step S24). The address generation unit 153 generates an address by using the instruction code and information from the RSA 142, and uses the generated address to cause the data cache 162 to perform prefetching.

The LDSTQ management unit 150 returns the instruction code to the RSA 142, and further transmits an interlock signal to the RSA 142 (Step S25).

On the other hand, when the input group number matches the number obtained by adding 1 to the first group number (positive at Step S22) or when the input group number matches the first group number (positive at Step S23), the LDSTQ management unit 150 determines that the acquired instruction can be stored in the LDSTQ 161. The LDSTQ management unit 150 allocates, to the load store instruction, an LDSTQ number corresponding to an actual entry in the LDSTQ 161. The LDSTQ management unit 150 stores the instruction code in the LDSTQ 161 at a position indicated by the LDSTQ number, and outputs a request to execute the load store instruction to the LDSTQ 161 (Step S26).

After that, the LDSTQ management unit 150 outputs an interlock release signal to release the interlock of the RSA 142. The LDSTQ 161 outputs an LDSTQ release signal after the processing of the load store instruction is completed (Step S27).

As described above, even when the LDSTQ has no space to store a particular load store instruction, the LDSTQ management unit according to the second embodiment prefetches data designated by the particular load store instruction, and stores data to be used in the data cache in advance. In this manner, the particular load store instruction can be stored in the LDSTQ, and when the particular load store instruction stored in the LDSTQ is thereafter executed, the data to be used reliably exists in the data cache. Consequently, cache misses can be reduced to improve processing performance of the core serving as an arithmetic processing device.

According to one aspect, the present invention can improve use efficiency of an arithmetic unit.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device, comprising:
   a storage;
   a processor coupled to the storage and the processor configured to:
      store, in the storage, load or store instructions with an upper limit being a first number, and sequentially output the stored load or store instructions to cause a cache or a memory to execute processing of data in accordance with the output load or store instructions;
      acquire load or store instructions, determine a queued number of load or store instructions which have not been output from the storage among load or store instructions output, by using a first signal indicating an output of the storage and a second signal indicating an output of the acquired load or store instructions, and when the queued number is smaller than a second number which is larger than the first number, allocate a provisional number to each of the load or store instructions and output the acquired load or store instructions to which the provisional number allocated; and
      acquire the load or store instructions output, and when a stored number of load or store instructions stored in the storage is smaller than the first number, allocate an actual number acquired based on the provisional number to each of the acquired load or store instructions and store the acquired load or store instructions in the storage in accordance with the actual number.

2. The arithmetic processing device according to claim 1, wherein the load or store instructions output are acquired and accumulated, and sequentially output to the storage,
   wherein a particular load or store instruction output is acquired, and when the stored number is equal to or larger than the first number, the particular load or store instruction is discarded, where the particular load or store instruction is caused to be output again.

3. The arithmetic processing device according to claim 2, wherein when the stored number is equal to or larger than the first number and the particular load or store instruction is discarded, output of the particular load store instruction from the accumulated load or store instructions is caused to stand by until the particular load or store instruction becomes storable in the storage, and when the particular load or store instruction becomes capable of being output to the storage, output the particular load or store instruction is caused again.

4. The arithmetic processing device according to claim 1, wherein when the stored number is equal to or larger than the first number, data handled by processing designated by the acquired load or store instructions is stored in the cache.

5. A method of controlling an arithmetic processing device including a load store queue that stores load or store instructions with an upper limit being a first number, and sequentially outputs the stored load or store instructions to cause a cache or a memory to execute processing of data in accordance with the output load or store instructions, the control method comprising:

controlling an instruction management circuit to acquire the load or store instructions;

determining a queued number of load or store instructions which have not been output from the load or store queue among load store instructions output from the instruction management circuit, by using a first signal indicating an output of the load store queue and a second signal indicating an output of the instruction management circuit;

controlling, when the queued number is smaller than a second number which is larger than the first number, the instruction management circuit to allocate a provisional number to each of the load or store instructions and to output the acquired load or store instructions to which the provisional number allocated;

controlling a storage management circuit to acquire the load or store instructions output from the instruction management circuit; and controlling, when a stored number of load or store instructions stored in the load or store queue is smaller than the first number, the storage management circuit to allocate an actual number acquired based on the provisional number to each of the acquired load or store instructions and to store the load or store instructions acquired by the storage management circuit in the load store queue in accordance with the actual number.

* * * * *